(12) United States Patent
Bitterfeld et al.

(10) Patent No.: US 11,316,746 B1
(45) Date of Patent: Apr. 26, 2022

(54) GENERATING A REPRESENTATION OF PROGRAM PROCESSES EXECUTING ON AN INFORMATION TECHNOLOGY ENVIRONMENT

(71) Applicant: ServiceNow, Inc., Santa Clara, CA (US)

(72) Inventors: Robert Bitterfeld, Petah Tikva (IL); Dinesh Kumar Kishorkumar Surapaneni, Chicago, IL (US); Asaf Garty, Sdei Hemed (IL); Baskar Jayaraman, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/145,690

(22) Filed: Jan. 11, 2021

(51) Int. Cl.
*H04L 29/08* (2006.01)
*H04L 41/12* (2022.01)
*H04L 41/5009* (2022.01)
*H04L 41/16* (2022.01)
*H04L 41/147* (2022.01)
*H04L 41/0893* (2022.01)

(52) U.S. Cl.
CPC .......... *H04L 41/12* (2013.01); *H04L 41/0893* (2013.01); *H04L 41/147* (2013.01); *H04L 41/16* (2013.01); *H04L 41/5009* (2013.01)

(58) Field of Classification Search
CPC .............................. H04L 41/12; H04L 41/147
See application file for complete search history.

(56) References Cited

U.S. PATENT DOCUMENTS

| | | | | |
|---|---|---|---|---|
| 9,531,607 | B1 * | 12/2016 | Pai | ......................... H04L 43/16 |
| 10,880,363 | B2 * | 12/2020 | Park | .................... G06F 16/9024 |
| 2006/0268742 | A1 * | 11/2006 | Chu | .................... H04L 43/0811 |
| | | | | 370/254 |
| 2018/0219894 | A1 * | 8/2018 | Crabtree | ............. H04L 63/1425 |
| 2018/0248768 | A1 * | 8/2018 | Ibrahim Rana | ....... H04L 41/145 |

\* cited by examiner

*Primary Examiner* — Adnan M Mirza
(74) *Attorney, Agent, or Firm* — Van Pelt, Yi & James LLP

(57) ABSTRACT

Identifications of program processes executing on an information technology environment are received. The identified program processes are clustered into a plurality of different groups. Identifications of interactions between at least a portion of the program processes are received. The identified interactions are analyzed to determine one or more interaction metrics between different group pairs in the plurality of different groups. A graph representation that includes at least a portion of the plurality of different groups as graph nodes in the graph representation is generated. The graph representation includes one or more graph edges determined to be included based on the one or more interaction metrics.

20 Claims, 9 Drawing Sheets

US 11,316,746 B1

GENERATING A REPRESENTATION OF PROGRAM PROCESSES EXECUTING ON AN INFORMATION TECHNOLOGY ENVIRONMENT

BACKGROUND OF THE INVENTION

Information technology services offer the ability to improve operating efficiency and productivity. The implementation of these services requires an information technology environment. Depending on size and complexity, it is common for an information technology environment to include tens to hundreds of different network computing devices, each with multiple running application processes. The running application processes can include servers offering network-based services such as web services, name services, authentication services, and others. The addition of new functionality typically requires deploying one or more new application service processes and potentially adding new hardware to the network environment. These different running processes are typically managed by an administrator with a deep understanding of which processes are running and how they interact.

BRIEF DESCRIPTION OF THE DRAWINGS

Various embodiments of the invention are disclosed in the following detailed description and the accompanying drawings.

DETAILED DESCRIPTION

Figure 1:
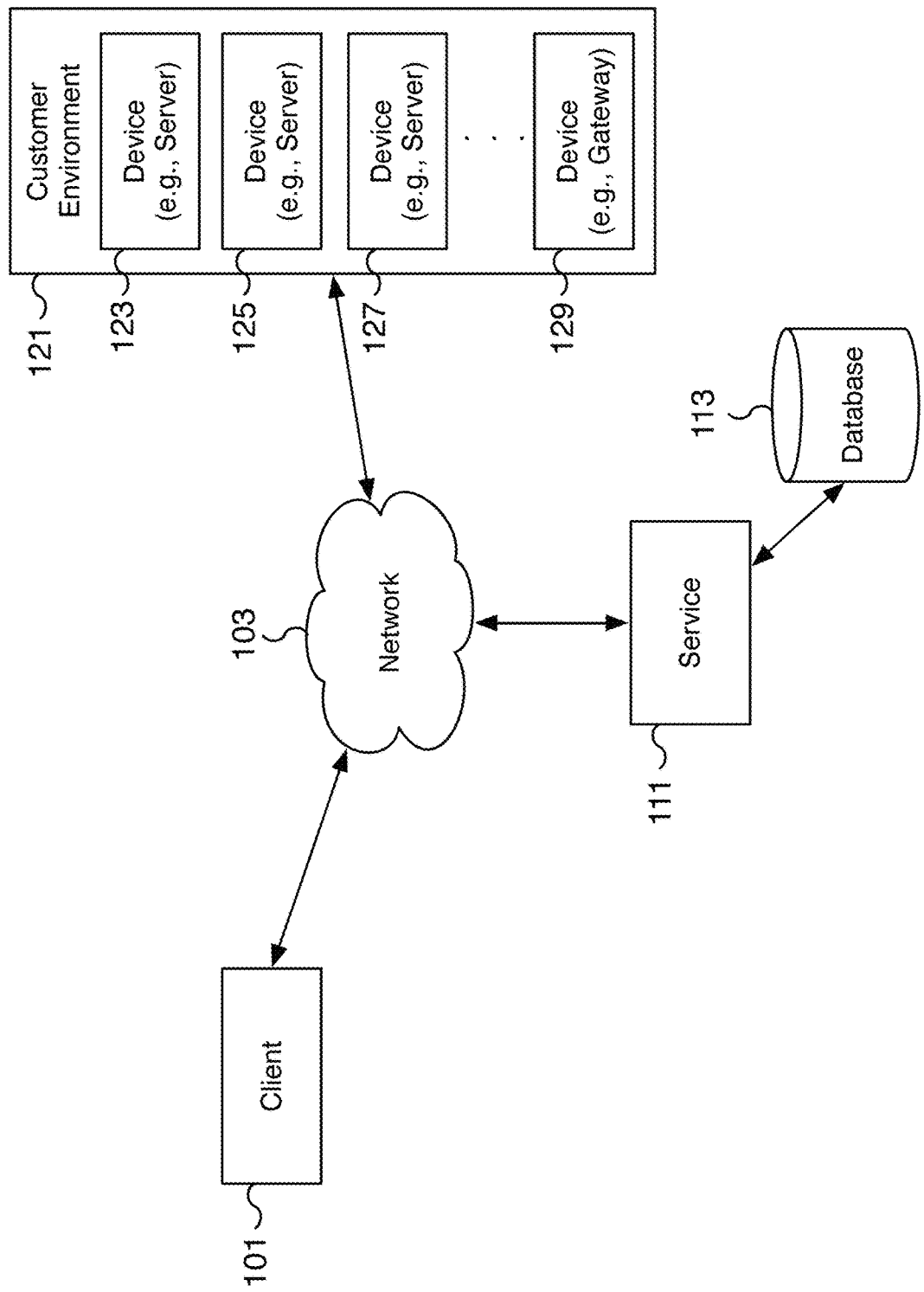
FIG. 1 is a block diagram illustrating an example of a network environment for the management of information technology operations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Mapping of information technology operations is disclosed. Using the techniques described within, the application services running in an information technology environment can be more effectively managed by identifying and mapping application services. The processes running within the information technology environment, such as various application server processes, are identified and fingerprinted. The fingerprinting allows similar processes to be grouped into application service groups. In some embodiments, the identifying of an application service group for a process is determined by applying a clustering technique and creating a prediction model. Once processes are clustered into application service groups, the interaction between the groups is analyzed by using the interactions between processes, such as the network connections established between the different processes of different groups. Metrics related to the interactions are determined, such as the number of incoming and outgoing connections and the sources and destinations of connections. In various embodiments, a graph of application group nodes is constructed using edge values based on the determined interaction metrics. The graph represents a mapping of application services operating within the information technology environment and how they interact. Nodes and edges that are noisy can be identified and eliminated to improve the graph representation of application services. For example, edges with low confidence metrics are removed along with corresponding nodes from the application graph. In some embodiments, an operator such as an information technology operations administrator can focus in on one or more specific application services by selecting the desired application services and generating a corresponding service map. Using the disclosed techniques, a graph representation is generated depicting the different application services that interact with the selected application services. The edges of the graph can be directional and can be quantified with edge confidence metrics. In some embodiments, the application nodes are further labeled into categories. For example, an operator can specify different application definitions which are applied to the application nodes to determine whether an application service belongs to one or more of the defined categories. Examples of categories include an internal application service, a support application service, a distributed application service, and a central application service. Other categories can be defined as well, such as security risk categories and relative rankings posed by certain risks. For example, application services can be grouped and labeled into different security risk categories such as low, medium, and high risk categories or different relative threat ranking categories such as low, medium, and high external threat risk categories.

In some embodiments, identifications of program processes executing on an information technological environment are received. For example, one or more agents are used to identify the processes running on deployed hardware devices in a customer's information technological environment. In some embodiments, the processes are identified by process name, path location, and arguments used to run the process. The identified program processes are clustered into a plurality of different groups. For example, each program process is assigned an application service group and the unique application service groups are identified by determining a set of unique clusters. In some embodiments, the unique clusters are identified by calculating distance measures between different processes to determine similarity. The identified program processes are also analyzed for interactions. In some embodiments, identifications of interactions between at least a portion of the program processes are received. For example, network connections and/or network communications between program processes are identified and received. The identified interactions are analyzed to determine one or more interaction metrics between different group pairs in the plurality of different groups. For example, the interactions are analyzed to identify metrics such as the number of network connections a node is connected to, which node of a pair is the source node of a connection and which is the receiver node of the connection, the ratios of incoming to outgoing connections, and the ratio of connections from one application service group compared to connections from all application service groups, among others. In some embodiments, a graph representation is generated that includes at least a portion of the plurality of different groups as graph nodes in the graph representation and includes one or more graph edges determined to be included based on the one or more interaction metrics. For example, based on the determined interaction metrics, one or more application service nodes are included in a graph representation showing the existence and interoperation of application services in the information technological environment. In various embodiments, the graph edges represent interactions between application services and can be quantified using edge metrics such as confidence scores. In some embodiments, the application services are categorized into one or more categories based on provided application definitions. For example, application services can be categorized as internal application services, support application services, distributed application services, and central application services.

FIG. 1 is a block diagram illustrating an example of a network environment for the management of information technology operations. In the example shown, client 101 is a network client used to access service 111. In various embodiments, service 111 provides cloud-based services for managing information technology operations including mapping application services running in information technology environment 121. Information technology environment 121 is the information technology environment of one of the users of service 111 and includes multiple hardware devices including devices 123, 125, 127, and 129, as examples. In various embodiments, the devices of information technology environment 121, such as devices 123, 125, 127, and 129, run application processes that interact with one another and/or with other computing devices outside of information technology environment 121. Client 101 can be utilized to manage information technology environment 121 by interfacing with service 111 and database 113. In various embodiments, database 113 is a configuration management database (CMDB). Client 101, service 111, and information technology environment 121 are communicatively connected via network 103. Network 103 can be a public or private network accessible by client 101, service 111, and information technology environment 121. For example, devices 123, 125, 127, and 129 of information technology environment 121 can be computing devices hosted on a private network with access to a public network such as network 103. In some embodiments, network 103 is a public network such as the Internet.

In some embodiments, client 101 may include a web browser that is utilized by an administrator of an organization to access service 111 for managing the organization's information technology environment. Service 111 is a network-accessible service such as a web accessible service that provides a user interface for client 101 and its administrator to manage an organization's information technology environment. In various embodiments, service 111 generates an application services map based on the processes running in a customer's information technology environment such as information technology environment 121. For example, using service 111, an administrator via client 101 can view an application services map that identifies the application services running on information technology environment 121. The generated service mapping can be provided by service 111 to client 101 as a graph representation of application services and their interactions and/or connectivity. Although not shown in the example, in some embodiments, client 101 is located within a customer's network environment, for example, as part of information technology environment 121.

In some embodiments, service 111 is a software service such as a software as a service (SAAS) application. Service 111 utilizes database 113 to store and retrieve information related to managed assets, including assets of an information technology environment such as information technology environment 121. Example assets can include devices 123, 125, 127, and 129 of information technology environment 121. In various embodiments, database 113 is a configuration management database used for managing assets that are under the management of an organization. Each managed asset can be represented as a configuration item. In some embodiments, database 113 can store information related to managed assets, such as the hardware and/or software configuration of a computing device, as configuration items. In various embodiments, database 113 provides persistent storage and allows an administrator via client 101 to remotely manage assets tracked using database 113.

In some embodiments, information technology environment 121 includes multiple application services that are run as processes of hardware computing devices such as devices 123, 125, 127, and 129 of information technology environment 121. In the example shown, devices 123, 125, and 127 are servers and run one or more application server processes while device 129 is a gateway device that runs a gateway application service. In various embodiments, one or more application processes are run on the devices and the functionality of the services can be distributed across multiple devices. Examples of application services include network services, virtual services, firewalls, gateways, naming services, queue services, web services, agent services, agent and/or monitoring services, security services, and/or file management services, among others. In various embodiments, the application services interact with other software and/or hardware devices such as communicating with other application services. The application services can include application services that initiate outgoing network connections such as a network client, application services that accept incoming network connections such as a network server, application services that function as peer-to-peer services that both initiate and/or accept network connections, and/or other configurations as appropriate. In various embodiments, the application services can function as a source and/or destination for network connections and/or other inter-process communication. In some embodiments, agents (not shown) are deployed on and/or to information technology environment 121 to identify the processes associated with the application services installed and/or running on the devices of information technology environment 121.

In various embodiments, the components shown in FIG. 1 may exist in various combinations of hardware machines. Although single instances of components have been shown to simplify the diagram, additional instances of any of the components shown in FIG. 1 may exist. For example, service 111 may include one or more cloud-based servers. Similarly, database 113 may not be directly connected to service 111 and/or may be replicated or distributed across multiple components. As another example, devices for a customer's information technology environment can be deployed across multiple different information technology environments and information technology environment 121 is an example of one information technology environment. In some embodiments, components not shown in FIG. 1 may also exist.

Figure 2:
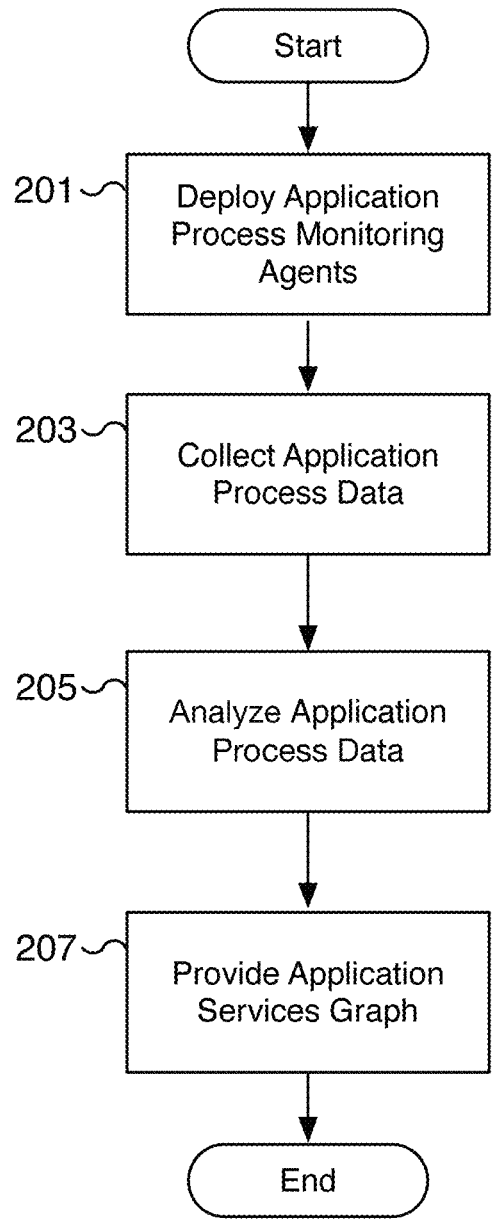
FIG. 2 is a flow chart illustrating an embodiment of a process for managing information technology operations.

FIG. 2 is a flow chart illustrating an embodiment of a process for managing information technology operations. Using the process of FIG. 2, an administrator, such as an information technology administrator of an organization, can map the application services of the organization's information technology environment and generate a corresponding application services graph. Nodes of the graph represent application services and the edges represent interactions and/or relationships between the different identified application services. In some embodiments, the generated graph includes only the most relevant nodes, for example, by excluding less relevant processes and/or detected noise. In various embodiments, a cloud-based service is used to remotely manage an information technology environment including managing the mapping of application services and accessing an application services graph of the mapped services. In some embodiments, the administrator accesses the cloud-based service using a client such as client 101 of FIG. 1. In some embodiments, the cloud-based service is service 111 of FIG. 1 and the organization's information technology environment is information technology environment 121.

At 201, application process monitoring agents are deployed. For example, one or more software and/or hardware agents are deployed and used to identify the processes running in the information technology environment. For example, in some embodiments, a software agent runs on a hardware computing device to identify the processes installed and/or running on the device. Multiple agents can be deployed to collect process data from a variety of different computing devices. In some embodiments, the agents remotely connect and/or passively monitor the information technology environment.

At 203, application process data is collected. For example, application process data including what processes are running, the parameters and/or configuration they are run with, and the path of the processes is collected. In some embodiments, the data is collected by the agents deployed at 201. For example, the data can be collected using at least in part process data collection scripts deployed to different computing devices of the information technology environment. In various embodiments, additional process data is collected such as the start time of a process, the total running time of a process, the stop time of a process, the memory used by a process, the privileges granted to a process, the network connections established with a process, network connections attempted by a process, the files accessed by a process, and/or other inter process communication performed by a process, among other process data.

At 205, application process data is analyzed. For example, the application process data collected at 203 is analyzed. In some embodiments, the data is analyzed by assigning the processes identified into application groups based on the collected process data. Using the collected process data, different unique application services are identified based on the assigned application group. Using the process data, interactions between application groups can be determined. For example, network connections between processes can be associated with interactions between application groups to which the processes are assigned. In various embodiments, the interactions are further analyzed to determine interaction metrics, such as confidence scores.

At 207, an application services graph is provided. Using the results of the process data analysis performed at 205, a mapping of application services is performed. In some embodiments, an application services graph is generated based on the mapped services. For example, nodes of the graph are identified application services and the edges are interactions between the application services. In various embodiments, the edges are associated with interaction metrics such as confidence ratings. Low confidence edges can be used to identify and remove noise or less relevant nodes. In some embodiments, the application services are further categorized, for example, by applying application service definitions. For example, application services can be identified as internal application services, support application services, distributed application services, and central application services by matching application service metrics to application service definitions. A generated graph of the application services is provided to a client, for example, via a web interface provided by a cloud-based service. In some embodiments, a user can select nodes and/or application services to reveal the interactions and associated application services of the selection.

Figure 3:
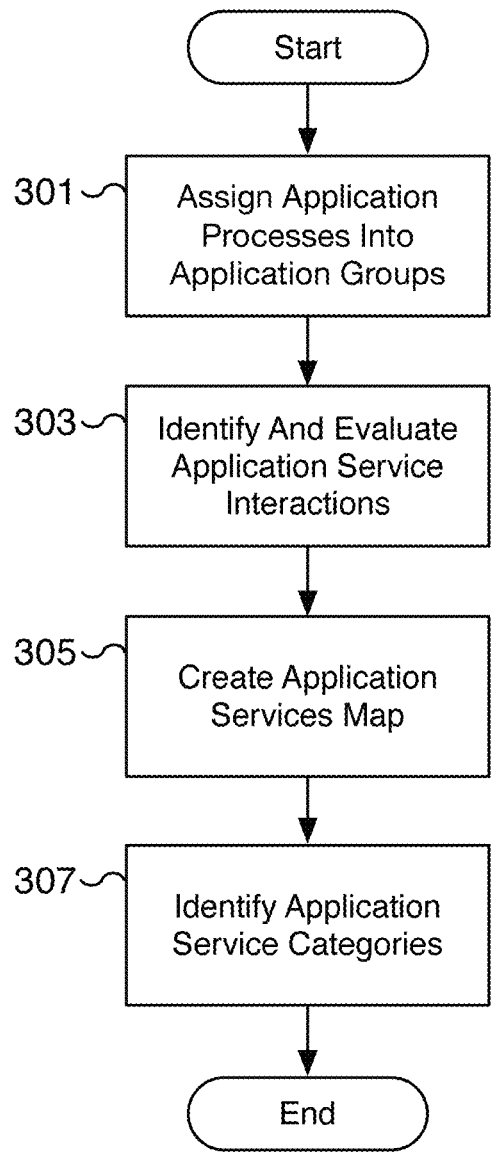
FIG. 3 is a flow chart illustrating an embodiment of a process for managing application services in an information technology environment.

FIG. 3 is a flow chart illustrating an embodiment of a process for managing application services in an information technology environment. Using the process of FIG. 3, an administrator, such as an information technology administrator of an organization, can identify, map, and categorize the application services of the organization's information technology environment based on collected process data. The mapped application services can be presented as a graph with interactions between the different identified services. The application services can also be categorized based on their characteristics. In various embodiments, the process of FIG. 3 is performed at 205 of FIG. 2 using process data collected at 203 of FIG. 2.

At 301, processes are assigned into application groups. For example, each process for which process data is collected is fingerprinted and assigned to a unique application group. In some embodiments, the fingerprinting process is performed by identifying similarities between processes. For example, a distance metric can be calculated for different identified processes by clustering the processes by process characteristics. Example process characteristics include a process executable name, a process executable path, and process execution arguments, among others.

At 303, application service interactions are identified and evaluated. For example, process interactions are used to identify interactions between application processes. The interactions can include incoming and outgoing network connections and other inter-process communication. In various embodiments, the interactions are evaluated to determine interaction metrics. The determined metrics can be used to identify how critical and/or relevant an application service is relative to other application services.

At 305, an application services map is created. For example, the evaluated interactions at 303 are used to create a mapping of application services and their associated relationships. In some embodiments, an application service is removed from the mapping based on interaction metrics such as low confidence metrics and/or low relevance scores. Relationships between services are mapped based on the interaction metrics. For example, interaction metrics such as the number of incoming and outgoing connections and the sources and destinations of connections are used to create an application services map.

At 307, application categories are identified. For example, each application service mapped can be categorized by one or more application service definitions. In some embodiments, an application service definition is defined by one or more rules or patterns. The rules can be based on interaction metrics such as the number of incoming connections, the number of outgoing connections, the type of incoming connections, the destination of outgoing connections, etc. An application service can match multiple application definitions. In various embodiments, the application definitions are used to identify an application service by its properties. For example, application definitions can be used to categorize application services as internal versus external application services. As another example, application definitions can be used to categorize applications by types of security threats such as identifying which application services are most exposed to external security threats.

Figure 4:
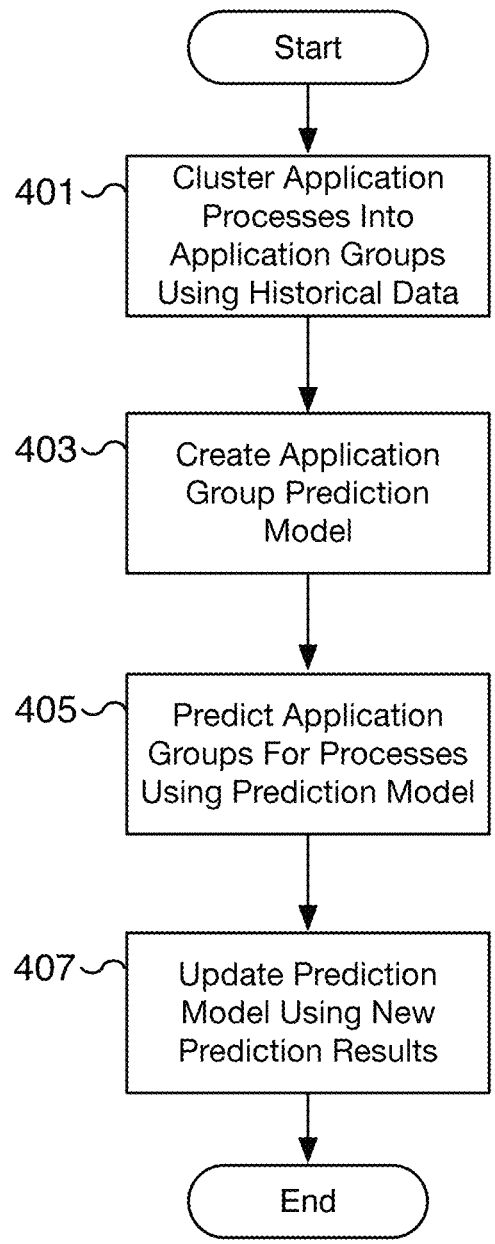
FIG. 4 is a flow chart illustrating an embodiment of a process for identifying application services in an information technology environment.

FIG. 4 is a flow chart illustrating an embodiment of a process for identifying application services in an information technology environment. Using the process of FIG. 4, application services are identified based on the processes running in an information technology environment. The identification is based on analyzing collected process data and clustering the identified processes into unique application groups using a prediction model. The application groups correspond to application services. As new processes are identified, they are assigned to an application group and the results can be used to update the prediction model. In various embodiments, the process of FIG. 4 is performed at 205 of FIG. 2 and/or at 301 of FIG. 3.

At 401, application processes are clustered into application groups using historical data. For example, process data collected is analyzed and used to cluster the associated application process into unique application groups. In some embodiments, an initial set of historical process data is utilized to create an initial set of unique clusters. For example, historical data of running processes including the process executable, path location, and execution arguments are used to identify an initial set of unique clusters of application groups. In some embodiments, the processes are first separated by their executable or process name. Then the unique process names are clustered based on their command line path and command line arguments. A similarity metric such as a distance metric is calculated using the process parameters to determine a unique cluster for each process. For example, in some embodiments, Levenshtein distance-based clustering is used to group the processes into unique application groups, each group corresponding to an application service. Processes with a calculated similarity metric that does not meet a configured threshold can be left unclustered. In some embodiments, the processes and their corresponding parameters are stored as database records in a cloud-based database such as database 113 of FIG. 1 and the clustering process is performed by iterating through process database records.

At 403, an application group prediction model is created. For example, using the clustering results from 401, a prediction model is created. In some embodiments, the unique entries of each cluster are randomly sampled by a scaling factor. For example, using a scaling factor of 0.1, each of the unique clusters are sampled to identify one or more samples. In some embodiments, the sampling is stratified such that each cluster has at least one sample and larger clusters have a higher number of samples. The identified samples are used to create the initial application group prediction model. In some embodiments, the prediction model is a trained machine learning model.

At 405, application groups for processes are predicted using the prediction model. For example, new processes and their captured process data are assigned to an application group using the prediction model created at 403. In some embodiments, processes are analyzed in batches, for example, by iterating through new process database records to cluster the new processes into unique application groups. In some embodiments, the prediction model is used to identify a nearest neighbor in the prediction model for each process. An application group can be predicted based on the determined distance to its nearest neighbor. For example, an application group is predicted in the event the distance score to its nearest neighbor is above a configured threshold value. In some embodiments, the distance metric is a Levenshtein score. In some embodiments, the prediction model is a machine learning model and the application group is inferred by applying the machine learning model to the new process data.

At 407, the prediction model is updated using new prediction results. For example, the prediction model is updated by adding new samples to the model. In various embodiments, using the initial model created at 403, a sampling of the results from the predictions performed at 405 are added to update the prediction model. The new samples to add can be determined by randomly subsampling unique records from results predicted at 405. In some embodiments, a configured scaling factor is used to determine the number of samples to add. In various embodiments, the steps of 405 and 407 can proceed continuously as new batches of process data are captured and new processes are assigned to application groups. Each new batch of processes and their predicted application groups can be used to update the prediction model.

Figure 5:
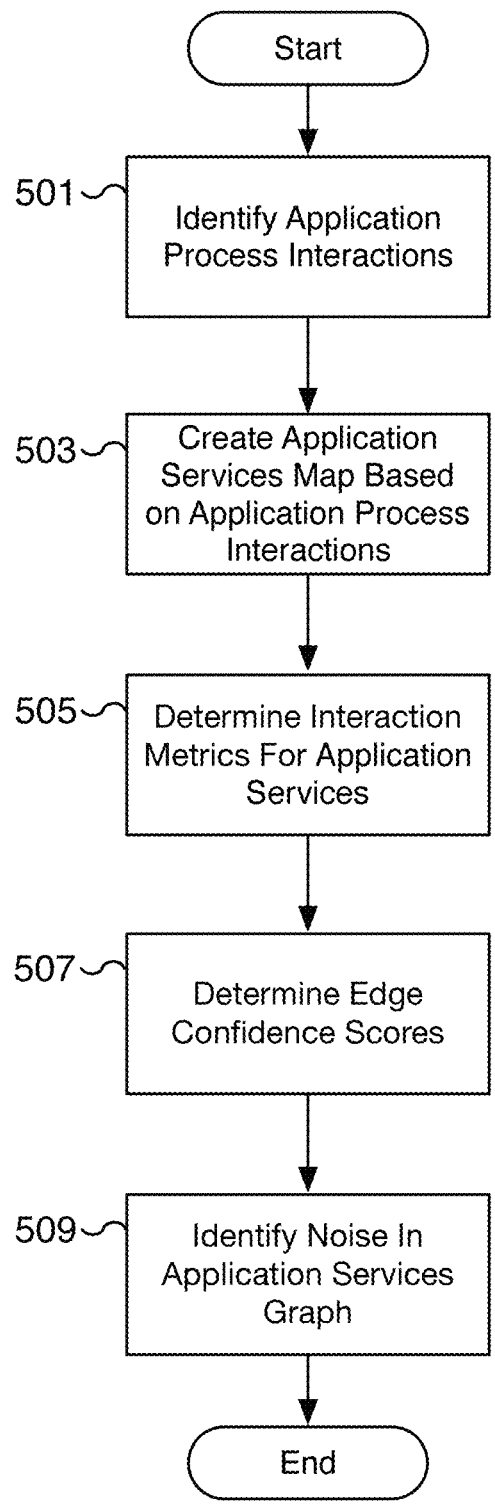
FIG. 5 is a flow chart illustrating an embodiment of a process for identifying relationships between application services in an information technology environment.

FIG. 5 is a flow chart illustrating an embodiment of a process for identifying relationships between application services in an information technology environment. Using the process of FIG. 5, interactions between application services are identified based on the processes running in an information technology environment. Metrics for the interactions are determined to identify and evaluate the relationship between different application services. In various embodiments, the process of FIG. 5 is performed at 205 and/or 207 of FIG. 2 and/or at 303 and/or 305 of FIG. 3.

At 501, application process interactions are identified. For example, application process data is analyzed to identify interactions. In some embodiments, the application process data is collected at 203 of FIG. 2. The interaction data can include network connections between processes, files accessed by the processes, pipes between processes, and other forms of inter-process communication. In various embodiments, the interactions for a process are mapped to their assigned application groups.

At 503, an application services graph is created based on application process interactions. For example, process interactions are used to identify application service interactions. In some embodiments, the connections between processes are used to identify the connections between the application groups each process is assigned to. The application groups and their connections are used to create an application services graph, with each application group represented by an application service node and the connections between application groups represented as edges in the graph between application service nodes. Each edge of the graph can represent multiple processes between the same application group pair. For each edge, process data is tracked to determine properties of the edge, such as how many processes correspond to an edge. For example, an edge between two application services can represent five network connections from application group two to application group one and two network connections from application group one to application group two.

At 505, interaction metrics for application services are determined. For each pair of application services of the graph created at 503, interaction metrics are determined for the connection using the process data tracked for the edge. For a particular pair of connected application services, interaction metrics are calculated based on the processes assigned to each of the pair of application services. In some embodiments, the interaction metrics are based on the number and type of connections between processes of different application services. In some embodiments, one or more interaction metrics are determined based on the number of unique source and/or destination processes rather than the total number of incoming or outgoing interactions. For example, metrics calculated can include the number of unique target processes from any application service with connections directed from processes of a specific application service (e.g., a unique count from the specific application service) and the number of unique source processes from any application service with connections directed to processes of a specific application service (e.g., a unique count to the specific application service). As another example, the total number of unique processes from a first application service with an outgoing connection to any process of a second application service is determined (e.g., a unique support count with reference to the first application service supporting the second application service). In various embodiments, additional interaction metrics can be determined as well to quantify the impact of each application service and their corresponding interactions with other application services.

As an example scenario, a first application service includes five processes, a second application service includes three processes, a third application service includes three processes, and a fourth application service includes three processes. With respect to process interactions, the processes from the first application service are directed to a mix of processes from the second and fourth application service and the processes from the second application service are directed only to the processes of the second application service. In the example scenario, the fourth application service has no outgoing connections. In some embodiments, the described example scenario corresponds to process and application services graph 900 of FIG. 9, where the first application service is application services 901 of FIG. 9, the second application service is application services 903 of FIG. 9, the third application service is application services 905 of FIG. 9, and the fourth application service is application services 907 of FIG. 9. A unique countfrom the first application service can be determined by analyzing the number of unique processes from the first application service with at least one outgoing connection to a process of other application service. In the scenario, three unique processes of the second application service and three unique processes of the fourth application service have connections from five unique processes of the first application service. The unique countfrom the first application service can be determined to have a value of five because there are five unique processes of the first application service with outgoing connections. A unique count to the second application service can be determined by analyzing all the incoming connections to the second application service from unique processes of other application services. In this scenario, four unique processes of the first application service and three unique processes of the third application service have connections to three unique processes of the second application service. The unique count to the second application service can be determined to have a value of seven. Also in the example scenario, four of the five unique processes of the first application service have connections to the second application service. The unique support count with reference to the first application service supporting the second application service has a value of four.

At 507, edge confidence scores are determined. For example, using the interaction metrics determined at 505, a confidence score is determined for each edge. In some embodiments, the edges are directional and have a source and target. For example, for bi-directional edges, a confidence score is determined for each direction. In some embodiments, multiple confidence scores can be determined for a directional edge. For example, a confidence score can be determined relative to a source application service and a confidence score can be determined relative to a target application service. For example, with respect to a pair of application services, a confidence score is determined based on the support a first application service provides a second application service relative to all other application services that the first application service interacts with (e.g., a confidence to the second application service from the first application service score). A confidence score can also be determined based on the support a first application service provides a second application service relative to all other application services that the second application service interacts with (e.g., a confidence from the first application service to the second application service score). The various confidence scores are determined to calculate the relative strength and specificity of a directional connection between application services.

Using the example scenario of step 505, three unique processes of the second application service and three unique processes of the fourth application service have connections from five unique processes of the first application service. The unique countfrom the first application service can be determined to have a value of five. Four unique processes of the first application service and three unique processes of the third application service have connections to three unique processes of the second application service. The unique count to the second application service can be determined to have a value of seven. Also in the example scenario, four of the five unique processes of the first application service have connections to the second application service. The unique support count with reference to the first application service supporting the second application service has a value of four. The confidence to the second application service from the first application service score has a value of 0.8 since the unique support count with reference to the first application service supporting the second application service has a value of four and the unique count from the first application service can be determined to have a value of five. The confidence from the first application service to the second application service score has a rounded value of 0.57 since the unique support count with reference to the first application service supporting the second application service has a value of four and the unique count to the second application service can be determined to have a value of seven. Using the pair of confidence interaction metrics, a representative strength and specificity of the connection is determined.

At 509, noise in the application services graph is identified. For example, the confidence scores calculated at 507 are used to determine which edges and nodes are noise and can be removed from the application services graph. In some embodiments, the confidence scores are categorized into different levels, such as low, medium, and high noise confidence levels. Edges with low confidence scores correspond to relative low specificity and are the process interactions associated with application processes that are likely noise. In various embodiments, fewer or more application services can be excluded from the application services graph based on the selected noise confidence level. Edges that do not meet the selected noise confidence level are removed and any nodes no longer connected to another node are also removed.

Figure 6:
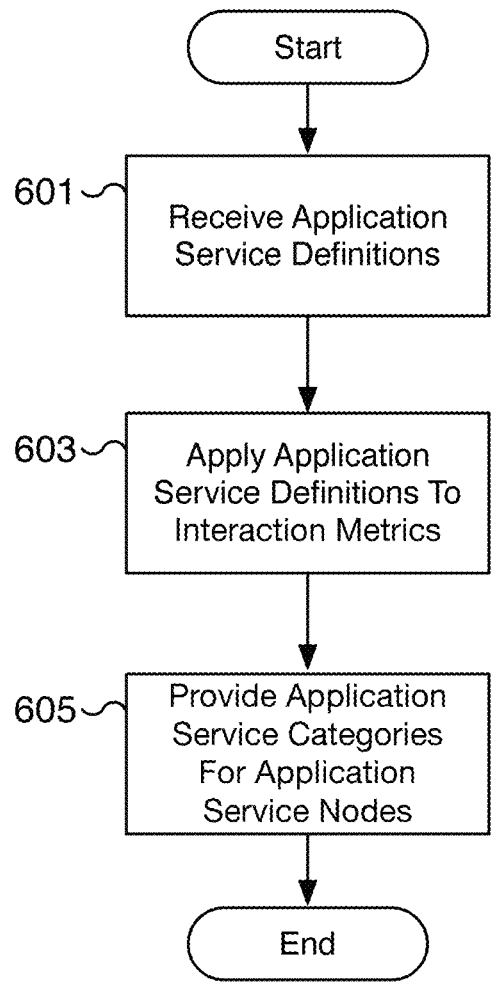
FIG. 6 is a flow chart illustrating an embodiment of a process for identifying application categories for application services in an information technology environment.

FIG. 6 is a flow chart illustrating an embodiment of a process for identifying application categories for application services in an information technology environment. Using the process of FIG. 6, application services identified using the processes of FIGS. 2-5 can be categorized by application definitions. An application service that matches an application definition falls into the category of the application definition. Examples of categories include an internal application service, a support application service, a distributed application service, and a central application service. Other categories can be defined as well, such as security risk categories and relative rankings posed by certain risks. For example, application services can be grouped and labeled into different security risk categories such as low, medium, and high risk categories or different relative threat ranking categories such as low, medium, and high external threat risk categories. In various embodiments, the application categories are based on definitions that utilize the interaction metrics determined for each application service. In some embodiments, the interaction metrics are determined at 205 of FIGS. 2, 303 and/or 305 of FIG. 3, and/or 505, 507, and/or 509 of FIG. 5. In various embodiments, the process of FIG. 6 is performed at 207 of FIG. 2 and/or at 307 of FIG. 3.

At 601, application service definitions are received. For example, one or more application service definitions are received. In some embodiments, the definitions are provided by an administrator via a cloud-based user interface. For example, a user of client 101 of FIG. 1 can configure one or more application service definitions by accessing service 111 of FIG. 1. In some embodiments, the received application service definitions are stored in a database such as database 113 of FIG. 1. In various embodiments, each provided application service definition includes at least one rule-based pattern and references one or more interaction metrics. Each rule-based pattern can require a reference interaction metric to meet a condition specified by a threshold value or fall within a threshold range. The application service definition can also require multiple rules connected using Boolean operators. For example, an application service definition can reference an average confidence score and require that the average confidence score must exceed a threshold value or fall within a threshold range. As additional examples, an application service definition can reference metrics such as the total number of unique processes for a target application service, the number of unique processes for a target application service from a specific application service, the total number of unique processes from a source application service, and/or the number of unique processes from a source application service to a specific application service, among others. In some embodiments, multiple definitions utilize the same interaction metrics but apply different threshold requirements. For example, different threshold requirements can be used to differentiate between an internal application service and an external application service.

At 603, application service definitions are applied to interaction metrics. For example, each application service definition is applied to each node of the application services graph to determine which nodes match the particular definition. In various embodiments, an application service node can match zero or more application definitions. For example, an application service node can match the respective application service definitions for a distributed application service and also a low-risk security threat.

At 605, application service categories for application service nodes are provided. For example, the categorization results from 603 are provided to the user via a user interface such as a web application. In some embodiments, the categories are provided by updating the graph of application services to label each application service node. In some embodiments, the categories are presented in a table format. In various embodiments, the categorization results are stored in a customer data store such as database 113 of FIG. 1.

Figure 7:
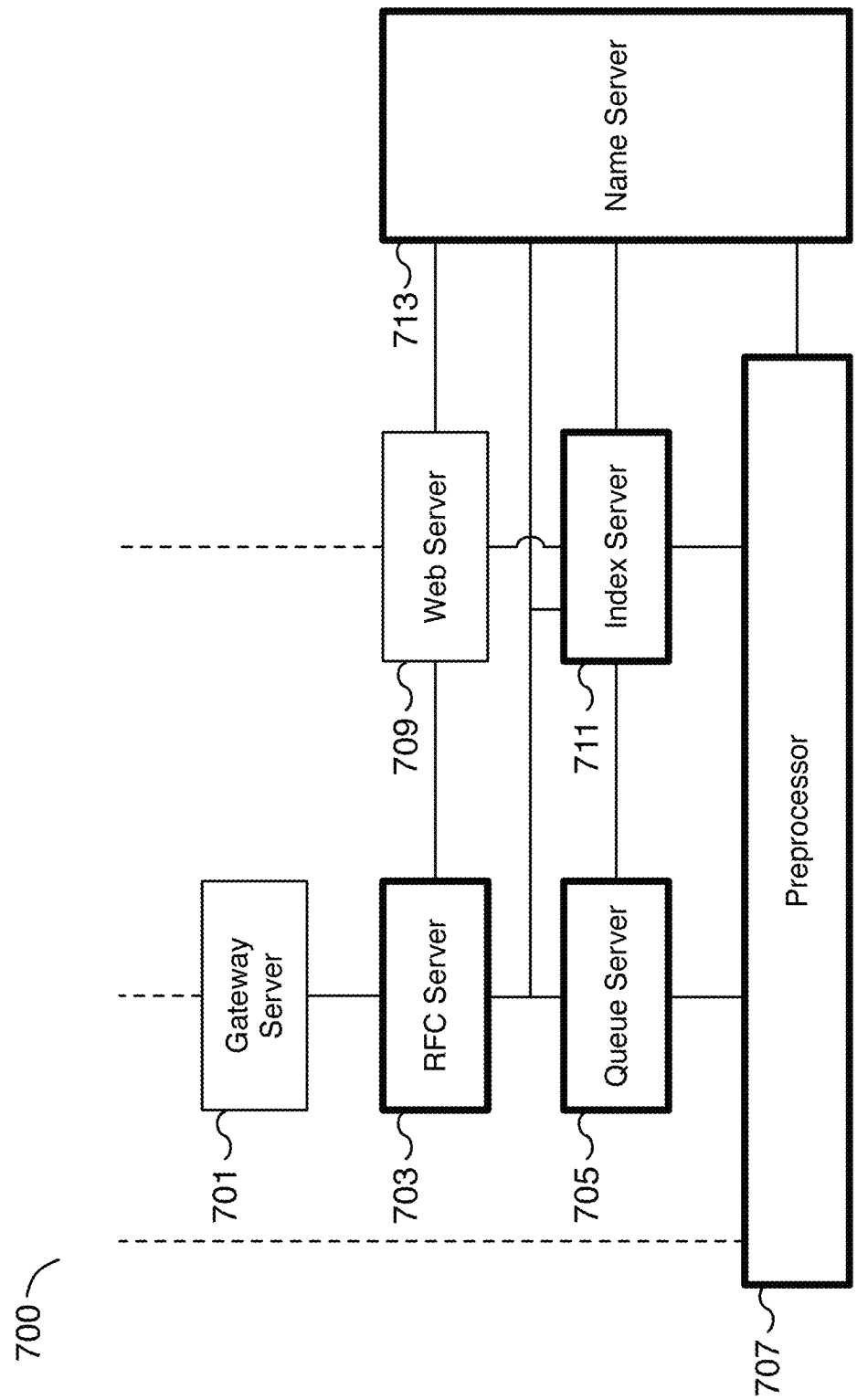
FIG. 7 is a diagram illustrating an example information technology environment service map.

FIG. 7 is a diagram illustrating an example information technology environment service map. Service map 700 depicts a representation of the application services running in at least a portion of an organization's information technology environment. The diagram of FIG. 7 is created by an administrator such as a system administrator of the organization without utilizing the techniques described herein. The components of service map 700 can be based on the understanding of the administrator and can be created based on knowledge of what components are installed, how they are connected, and the results of various monitoring or probing tools, and/or other network infrastructure knowledge. In the example shown, service map 700 depicts gateway server 701, RFC server 703, queue server 705, preprocessor 707, web server 709, index server 711, and name server 713. The components in bold (i.e., RFC server 703, queue server 705, preprocessor 707, index server 711, and name server 713) are critical components for a particular set of services. The remaining components (i.e., gateway server 701 and web server 709) are utilized for multiple services and are less critical to the particular set of services. In the example shown, the solid and dashed lines represent connections between different components. The dashed lines are connections to components not shown, such as components external to the organization's information technology environment. In many scenarios, the connections between components of service map 700 are hypothetical and may not represent the actual connections between processes running in the information technology environment. In contrast, using the processes of FIGS. 2-6, an application services graph can be automatically generated that identifies the application services running in the information technology environment along with their relative interactions based on the data collected from running processes and their respective interactions.

Figure 8:
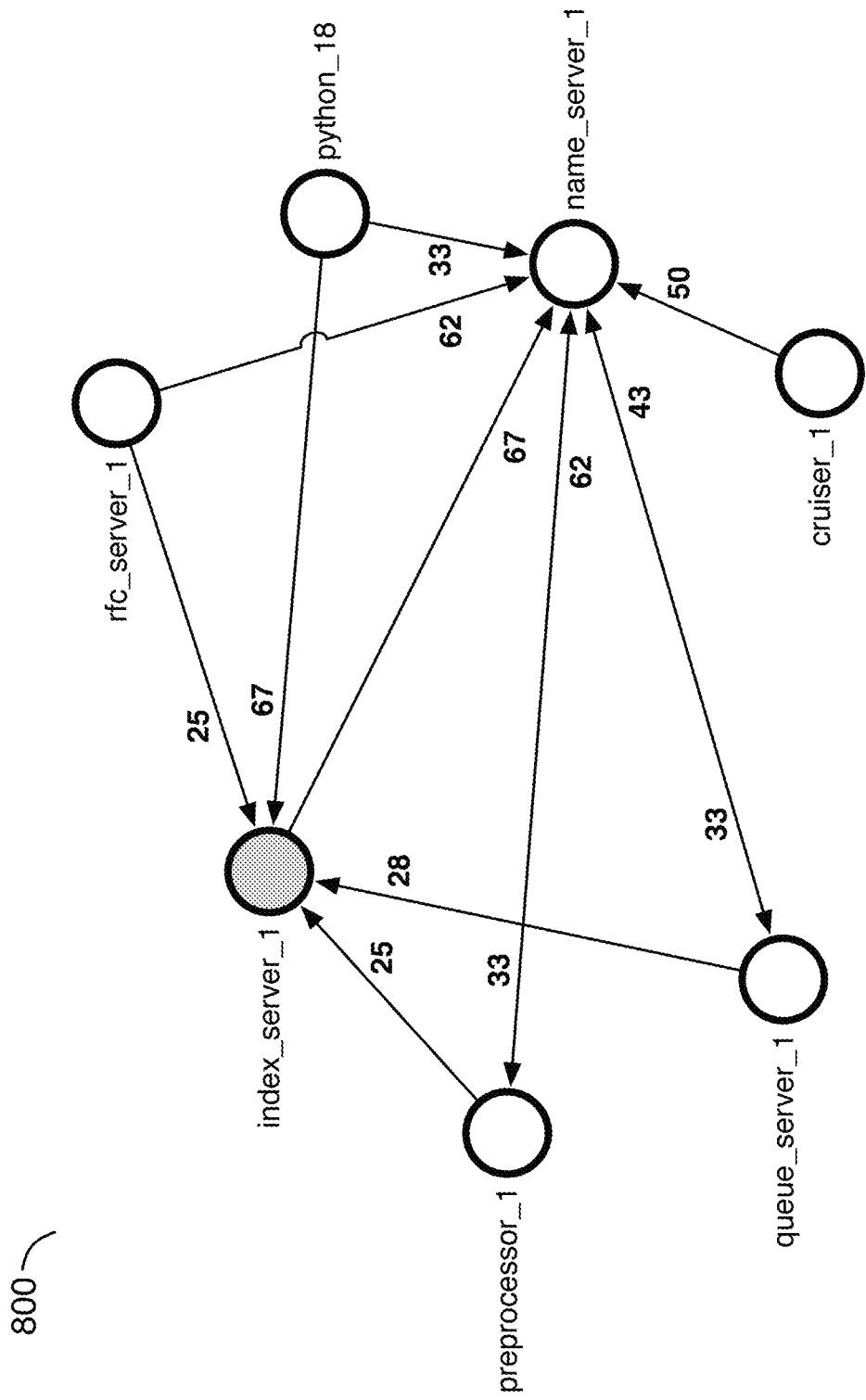
FIG. 8 is a diagram illustrating an embodiment of an application services graph corresponding to an information technology environment.

FIG. 8 is a diagram illustrating an embodiment of an application services graph corresponding to an information technology environment. In the example shown, application services graph 800 is generated using the processes of FIGS. 2-6 and depicts the application services running in an organization's information technology environment based on process data collected by monitoring actual devices of the information technology environment. Application services graph 800 includes application service nodes shown as circles with directional connections between the application service nodes. The direction of the connection corresponds to the direction of the network connection, such as an incoming and/or outgoing connection. The numeric labels associated with each connection are a confidence score based on determined interaction metrics. Each application service node is labeled with the process name and appended with an application group count. For example, index_server_1 corresponds to the first index server application group. Similarly, python_18 corresponds to the eighteenth python application service. Different python services are assigned to different application groups, each corresponding to a different python service. In the example shown, index_server_1 node is filled in to designate that the user of the application services graph selected the index_server_1 application service. In various embodiments, the selected service is used to build the application services graph and to identify all relevant and related services. For example, other identified services (such as python_1, python_2, etc.) are excluded from application services graph 800, for example, because their corresponding application services were not relevant to index_server_1.

In the example shown, connections between application services of application services graph 800 resemble but do not exactly match service map 700 of FIG. 7. For example, application services graph 800 includes python_18 and cruiser_1. These two application services are not represented in service map 700 of FIG. 7. Their inclusion in application services graph 800 but not in service map 700 indicates that the two services should likely be included in service map 700 of FIG. 7 to accurately reflect the reliance on the two application services. As another example, queue_server_1 includes connections to index_server_1 and to/from name_server_1. The connection from queue_server_1 to index_server_1 corresponds to the connection between queue server 705 and index server 711 of FIG. 7 and the bi-directional connection between queue_server_1 and name_server_1 corresponds to the connection between queue server 705 and name server 713 of FIG. 7. However, service map 700 of FIG. 7 indicates that queue server 705 is additionally connected to RFC server 703 and preprocessor 707 of FIG. 7. An analysis of the running processes and their interactions indicates that there is little to no direct interaction between the queue server 705 of FIG. 7 and the two components RFC server 703 and preprocessor 707 of FIG. 7 since the application service node for queue_server_1 does not share edges with the application nodes for rfc_server_1 and preprocessor_1. By utilizing an application services graph based on actual processes monitored for devices in the information technology environment, such as application services graph 800, an administrator is provided with a current and more detailed representation of the various processes running in the information technology environment.

Figure 9:
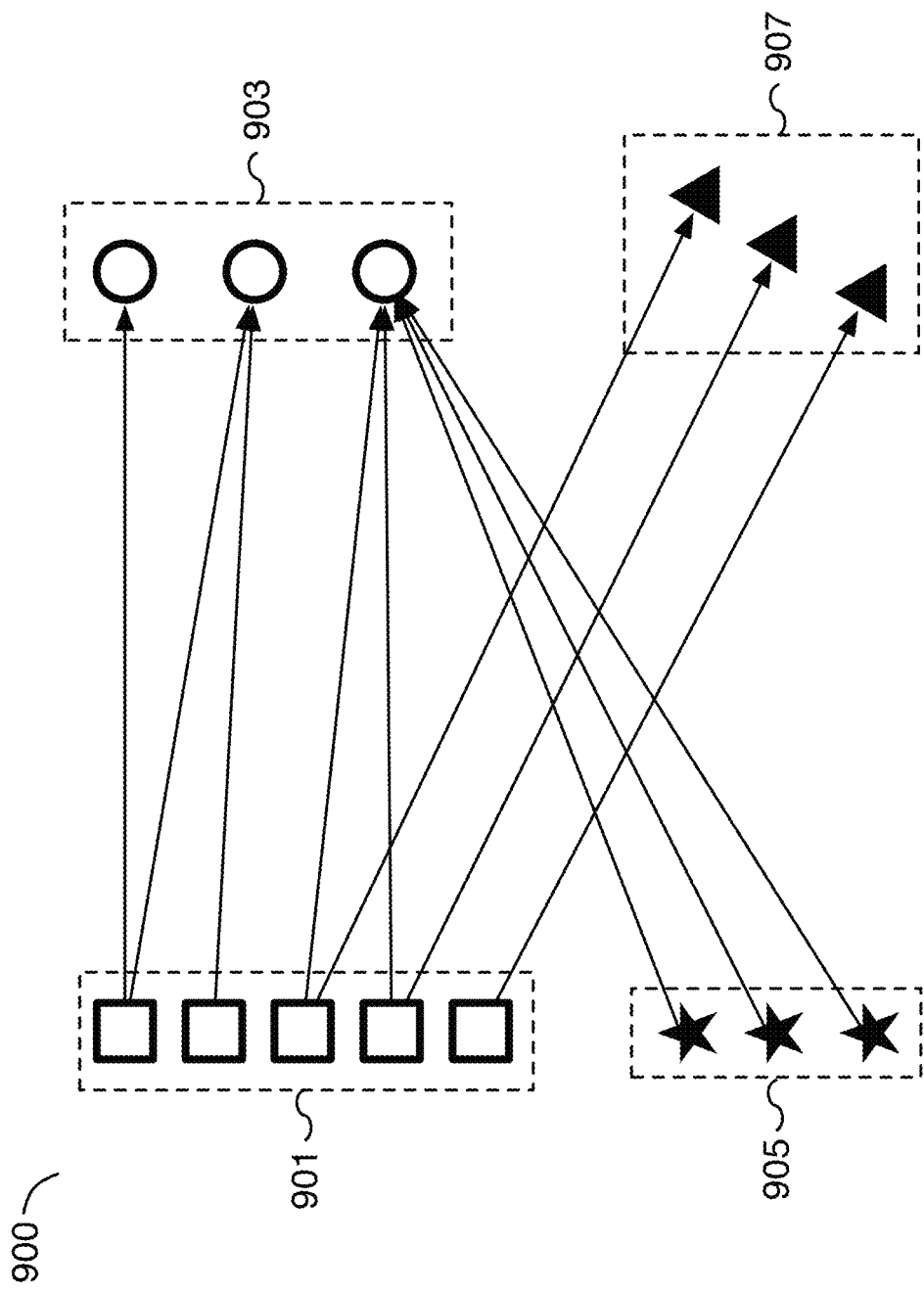
FIG. 9 is a diagram illustrating an embodiment of a process and application services graph from an analyzed information technology environment.

FIG. 9 is a diagram illustrating an embodiment of a process and application services graph from an analyzed information technology environment. In the example shown, process and application services graph 900 represents an information technology environment that has been analyzed using the techniques described herein to identify the application program processes of different applications services and the interactions between the services. Process and application services graph 900 includes four different application services, each represented by assigned application program processes with a different shape. In the example shown, application service 901 is a first application service that includes five processes, each shown as a square. Application service 903 is a second application service that includes three processes, each shown as a circle. Application service 905 is a third application service that includes three processes, each shown as a star. Application service 907 is a fourth application service that includes three processes, each shown as a triangle. The interactions between processes of each application service are shown with directed lines. For example, application service 901 has eight outgoing connections, five to processes of application service 903 and three to processes of application service 907. The processes of application service 903 receive from application service 901 a total of five incoming connections from four unique processes of application service 901. The processes of application service 903 additionally receive from application service 905 a total of three incoming connections from three unique processes of application service 905.

In various embodiments, the interaction metrics and edge confidence scores for the application services can be determined using at least the identified processes, their assigned application services, and the interactions between the processes of the services. Using the determined interaction metrics and edge confidence scores, noise can be removed, and an application service map can be created such as application services graph 800 of FIG. 8. For example, using application services 901 and 903 as examples, interaction metrics and edge confidence scores for the corresponding application services can be determined. The unique countfrom application service 901 can be determined to have a value of five because there are five unique processes of application service 901 with outgoing connections. Similarly, a unique count to application service 903 can be determined to have a value of seven since there are four unique processes of application service 901 and three unique processes of application service 905 that have connections to the three unique processes of application service 903. As another example, unique support count with reference to application service 901 supporting application service 903 has a value of four, since four of the five unique processes of application service 901 have connections to application service 903. In various embodiments, the confidence to application service 903 from application service 901 score has a value of 0.8 since the unique support count with reference to application service 901 supporting application service 903 has a value of four and the unique countfrom application service 901 can be determined to have a value of five. The confidence from application service 901 to application service 903 score has a rounded value of 0.57 since the unique support count with reference to application service 901 supporting application service 903 has a value of four and the unique count to application service 903 can be determined to have a value of seven. In various embodiments, by determining a pair of confidence interaction metrics, a representative strength and specificity for the connections between the different application services can be determined, noise can be identified, and an application service map can be generated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving identifications of program processes executing on an information technology environment;
clustering the identified program processes into a plurality of different groups, wherein the identified program processes that are clustered are processes of one or more application programs and the plurality of different groups represent different application service groups and each of the different application service groups includes one or more similar program processes;
receiving identifications of interactions between at least a portion of the program processes;
analyzing the identified interactions to determine one or more interaction metrics between different group pairs in the plurality of different groups; and
generating a graph representation that includes at least a portion of the different application service groups as graph nodes in the graph representation and includes one or more graph edges connecting one or more pairs included in the graph nodes, where the one or more graph edges are determined to be included in the graph representation based on the one or more interaction metrics.

2. The method of claim 1, wherein the identified program processes are clustered into the plurality of different groups including by applying a prediction model configured to utilize a name, a path, and arguments for each of the program processes.

3. The method of claim 2, wherein the prediction model is generated including by determining similarity metrics using a training dataset to identify unique clusters, and the unique clusters are randomly sampled to extract a threshold number of samples from each unique cluster of the identified unique clusters.

4. The method of claim 3, wherein the similarity metrics are determined at least in part by determining Levenshtein distances between different entries of the training dataset.

5. The method of claim 2, wherein the prediction model is based at least in part on the extracted threshold number of samples from each unique cluster of the identified unique clusters.

6. The method of claim 2, wherein the prediction model is updated by sampling prediction results and adding the sampled prediction results to the prediction model.

7. The method of claim 1, wherein analyzing the identified interactions to determine the one or more interaction metrics between the different group pairs in the plurality of different groups includes determining, for at least one of the plurality of different groups, a number of unique source program processes from the at least one of the plurality of different groups with at least one outgoing connection directed to a target program process of the plurality of different groups.

8. The method of claim 1, wherein analyzing the identified interactions to determine the one or more interaction metrics between the different group pairs in the plurality of different groups includes determining, for at least one of the plurality of different groups, a number of unique source program processes from the plurality of different groups with connections directed to target program processes of the at least one of the plurality of different groups.

9. The method of claim 1, wherein analyzing the identified interactions to determine the one or more interaction metrics between the different group pairs in the plurality of different groups includes determining a total number of unique program processes from a first group of the plurality of different groups with an outgoing connection to a program process of a second group of the plurality of different groups.

10. The method of claim 1, further comprising:
receiving an application service definition, wherein the application service definition is based on a condition comparing at least one of the one or more interaction metrics to a threshold value; and
identifying one or more of the graph nodes in the graph representation that match the condition of the application service definition.

11. The method of claim 10, further comprising:
labeling the identified one or more of the graph nodes in the graph representation that match the condition of the application service definition with a category defined by the application service definition.

12. A system, comprising:
one or more processors; and
a memory coupled to the one or more processors, wherein the memory is configured to provide the one or more processors with instructions which when executed cause the one or more processors to:
receive identifications of program processes executing on an information technology environment;
cluster the identified program processes into a plurality of different groups, wherein the identified program processes that are clustered are processes of one or more application programs and the plurality of different groups represent different application service groups and each of the different application service groups includes one or more similar program processes;
receive identifications of interactions between at least a portion of the program processes;
analyze the identified interactions to determine one or more interaction metrics between different group pairs in the plurality of different groups; and
generate a graph representation that includes at least a portion of the different application service groups as graph nodes in the graph representation and includes one or more graph edges connecting one or more pairs included in the graph nodes, where the one or more graph edges are determined to be included in the graph representation based on the one or more interaction metrics.

13. The system of claim 12, wherein the identified program processes are clustered into the plurality of different groups including by applying a prediction model configured to utilize a name, a path, and arguments for each of the program processes.

14. The system of claim 13, wherein the prediction model is generated including by determining similarity metrics using a training dataset to identify unique clusters, and the unique clusters are randomly sampled to extract a threshold number of samples from each unique cluster of the identified unique clusters.

15. The system of claim 13, wherein the prediction model is updated by sampling prediction results and adding the sampled prediction results to the prediction model.

16. The system of claim 12, wherein the one or more processors are caused to analyze the identified interactions to determine the one or more interaction metrics between the different group pairs in the plurality of different groups including by being caused to determine, for at least one of the plurality of different groups, a number of unique source program processes from the at least one of the plurality of different groups with at least one outgoing connection directed to a target program process of the plurality of different groups.

17. The system of claim 12, wherein the one or more processors are caused to analyze the identified interactions to determine the one or more interaction metrics between the different group pairs in the plurality of different groups including by being caused to determine, for at least one of the plurality of different groups, a number of unique source program processes from the plurality of different groups with connections directed to target program processes of the at least one of the plurality of different groups.

18. The system of claim 12, wherein the one or more processors are caused to analyze the identified interactions to determine the one or more interaction metrics between the different group pairs in the plurality of different groups including by being caused to determine a total number of unique program processes from a first group of the plurality of different groups with an outgoing connection to a program process of a second group of the plurality of different groups.

19. The system of claim 12, wherein the memory is further configured to provide the one or more processors with instructions which when executed cause the one or more processors to:

receive an application service definition, wherein the application service definition is based on a condition comparing at least one of the one or more interaction metrics to a threshold value; and identify one or more of the graph nodes in the graph representation that match the condition of the application service definition.

20. A computer program product, the computer program product being embodied in a non-transitory computer readable storage medium and comprising computer instructions for:

receiving identifications of program processes executing on an information technology environment;

clustering the identified program processes into a plurality of different groups, wherein the identified program processes that are clustered are processes of one or more application programs and the plurality of different groups represent different application service groups and each of the different application service groups includes one or more similar program processes;

receiving identifications of interactions between at least a portion of the program processes;

analyzing the identified interactions to determine one or more interaction metrics between different group pairs in the plurality of different groups; and generating a graph representation that includes at least a portion of the different application service groups as graph nodes in the graph representation and includes one or more graph edges connecting one or more pairs included in the graph nodes, where the one or more graph edges are determined to be included in the graph representation based on the one or more interaction metrics.

* * * * *